United States Patent [19]

O'Brien et al.

[11] 4,358,401

[45] Nov. 9, 1982

[54] LIQUID EMULSION SCINTILLATORS WHICH SOLIDIFY FOR FACILE DISPOSAL

[75] Inventors: Robert E. O'Brien, Belmont; Jeanne K. Krieger, Lexington, both of Mass.

[73] Assignee: New England Nuclear Corporation, Boston, Mass.

[21] Appl. No.: 135,763

[22] Filed: Mar. 31, 1980

[51] Int. Cl.$^3$ .............................. G21F 9/16; G21F 9/14
[52] U.S. Cl. ................................... 252/628; 252/632; 252/301.17
[58] Field of Search .................... 252/301.1 W, 301.17

[56] References Cited

U.S. PATENT DOCUMENTS

| | | | |
|---|---|---|---|
| 3,068,178 | 12/1962 | Kallmann et al. ............. | 252/301.17 |
| 3,457,180 | 7/1969 | Kretz et al. ....................... | 252/301.2 |
| 3,928,227 | 12/1975 | Sena et al. ....................... | 252/301.17 |
| 4,127,499 | 11/1978 | Chen et al. ....................... | 252/301.17 |
| 4,230,597 | 10/1980 | Bustard et al. ............... | 252/301.1 W |

FOREIGN PATENT DOCUMENTS 2614519 10/1977 Fed. Rep. of Germany .

OTHER PUBLICATIONS

Sachan et al., "Decontamination and Recovery of 1,4-Dioxane-based Liquid Scintillator", *Health Physics*, vol. 36, (Jan. 1979), pp. 67-68.
Rompps Chemie-Lexikon, 7th Ed., 1975, vol. 5, p. 3398.
Claycamp et al., "Volume Reduction of Liquid Scintillation Counting Wastes", *Health Physics*, vol. 34, (Jun. 1978), pp. 716-718.
Kojima et al., "Basic Studies on Removal of Hydrophilic Radioactive Substances . . . ", *Radioisotopes*, vol. 28, (1979), pp. 447-449 (applicant's translation).
Kaneko et al., "A Note on the Treatment of Liquid Scintillation Counter Waste Liquid", *Radioisotopes*, vol. 28, (1978), pp. 92-94 (applicant's translation).
Granlund, "Incineration of Waste Liquid Scintillation Fluid", *Mgmt. of Low-Level Rad. Wastes*, vol. 1, Pergamon Press, N.Y., (1979), pp. 419-427.
Anderson et al., "A Preliminary Impact Assessment of Institutional . . . ", EPA 520/3-79-002, (1979), pp. 151-158.
Bollinger et al., "A Simple Gellation Procedure for Liquid Scintillation Counting", *Anal. Chem.*, vol. 39, (1967), pp. 1508-1509.

*Primary Examiner*—Deborah L. Kyle
*Attorney, Agent, or Firm*—Sewall P. Bronstein

[57] ABSTRACT

A liquid organic scintillation cocktail which is readily converted to a solid for disposal after use. Also disclosed are a method of disposal of radwaste employing the cocktail and a kit useful for practicing the method.

21 Claims, No Drawings

LIQUID EMULSION SCINTILLATORS WHICH SOLIDIFY FOR FACILE DISPOSAL

BACKGROUND OF THE INVENTION

1. Field of the Invention

The present invention relates to liquid organic emulsion scintillators, and more particularly, to liquid organic emulsion scintillators which can be polymerized into solids for facile disposal.

2. Description of the Prior Art

A significant portion of low level radioactive wastes (radwastes) originate from non-fuel cycle sources, including medical and academic institutions. These institutional radwastes include organic liquid scintillation liquids (LSC cocktails) which present particular problems. One means for disposal of such radwastes is by burial in shallow trenches at commercial burial sites. Due to the limited number of such sites, radwastes are often transported over long distances for burial. The problems inherent in transporting such radwastes are well known, such as an accidental discharge resulting from an accident to the container, e.g. tank truck or tank car, transporting the liquid radwaste. An assessment of the problems of institutional radwaste disposal is made in R. Anderson et al., "A Preliminary Impact Assessment of Institutional Radioactive Waste Disposal", pp. 151-8 EPA 520/3-79-002 (1979).

At present, a preferred method used commercially to manage the problems of LSC cocktail radwaste transportation and disposal is mixing with adsorbents (at a loading ratio of up to 1:10 LSC cocktail to adsorbent) and then loading the combination into barrels for transportation to a disposal site. However, this alternative has at least two disadvantages. The first is that small institutions are at a disadvantage in that the wastes must either be shipped to an intermediate processing facility or stored until sufficient waste is accumulated to economically justify a separate shipment to a burial facility. The second disadvantage is the large amount of limited burial space which is used up when such a large volume of adsorbent must be used to dispose of LSC cocktail radwaste.

Other approaches to solving the problem of LSC cocktail radwaste have been suggested. For example, S. R. Sachen et al, *Health Physics*, 36, 67 (1970) describes a method for decontamination and recovery of 1,4 dioxane based liquid scintillator. Another suggestion for reducing the above problem is volume reduction of the waste by distillation as described in H. G. Claycamp et al., *Health Physics*, 34, 716 (1978) and S. Kojma et al., *Radioisotopes*, 28, 447-9 (1979). The possibility of incineration of waste liquid scintillation fluid is treated by R. W. Granlund in M. W. Carter et al, eds., *Management of Low-Level Radioactive Waste*, Vol. 1, p. 419, Pergamon Press, New York (1979). Each of the above possibilities has its own disadvantages which have hindered their wide scale development and use.

Because solids have advantages in terms of ease of handling during transportation and disposal, attention has been directed to reducing the problems described above. In addition to reductions in volume by distillation, other means of reducing the wastes to solid form have been pursued. One such avenue of purusit has been the addition of monomers such as polyurethane or epoxy resins to encapsulate concentrated wastes according to a method described in T. Kaneko et al., *Radioisotopes*, 28, 92-4 (1979). That article describes a process whereby the organic liquid and water are largely evaporated before resins are added to the remaining concentrate and the resins polymerized to encapsulate the radwaste. As set forth by the authors of that article, various problems remain in using their procedure, including adapting the polymer to the particular cocktail, and the incineration or other method used for disposal of the extracted solvents. The cost of the monomer resins must be taken into account. Moreover, as noted by the authors, the monomer resins are an added component and by their estimates, the pre-treatment weight and volume of LSC cocktail would be doubled by treating the LSC cocktail waste without first removing the volatile components of the cocktail. In addition, when such an encapsulation method is used, the volatile components are not solidified, but instead are only temporarily trapped and can be released unexpectedly, creating hazards of fire and the potential for exposure to toxic fumes for persons handling the waste.

While plastic scintillators are known in the prior art, there are a number of situations where they are not useful, e.g., when the sample is soluble only in aqueous solutions. Furthermore, plastic scintillators are typically not useful for counting low energy particles often used in tracer studies such as those emitted when tritium is the radiolabel.

Counting of biological fluids as gelled suspensions is described in Bollinger et al, *Anal. Chem.*, 39, 1508 (1967). However, no system is presently available which counts as a fluid emulsion and can be subsequently solidified for disposal. Furthermore, in prior art systems, (1) the volume of waste for disposal is significantly increased during the treatment process or (2) additional steps are involved in the disposal process which many times generate other wastes, e.g. evaporated solvents, and (3) no solidification of the volatile solvents takes place, but rather such solvents are either encapsulated or absorbed.

SUMMARY OF THE INVENTION

The present invention comprises a liquid organic scintillation cocktail which counts solutions of radiolabelled compounds containing up to ten percent by volume of water with high efficiency and is readily polymerizable to a solid for facile disposal. The cocktail comprises a polymerizable organic solvent, a solubilizing agent, an intermediate solvent, and an organic scintillator. The present invention also comprises a method of disposing of liquid organic scintillation cocktail waste and a kit useful for practicing the method.

DETAILED DESCRIPTION OF THE INVENTION

The liquid scintillation cocktails of the present invention comprise a polymerizable organic solvent, a solubilizing agent, an intermediate solvent and an organic scintillator.

The organic solvent of the present invention is chosen such that is is readily polymerizable by the addition of suitable polymerizing agents. Examples of such solvents include compounds containing vinyl groups. Particularly preferred compounds according to the present invention are styrene, methylmethacrylate, and allylbenzene. Other preferred compounds according to the present invention are p-methylstyrene, 4-allyl-1-methoxybenzene, p-methylstyrene, 2,4-dimethylstyrene, 2,5-dimethylstyrene, 2,6-dimethylstyrene and vinyl norborene. Other solvents useful in the practice of the invention include cinnamyl alcohol, phenylacrylate, vinyl benzoate, benzylacrylate, methyl eugenol, cinnamyl acetate, allyl phthalate, indene, dimethoxyallyl benzene, hydroxyethylmethacrylate, phenyl methacrylate, benzyl methacrylate, phenethylmethacrylate, phenethylacrylate, xylylacrylates, α-methyl styrene, vinyl anisole, allyl benzoate and β-phenethylcinnamate. The organic solvent serves as the principal solvent in the system and forms the bulk of the solid after polymerization is accomplished. Typical concentrations are from about 45% to about 80% by volume of the total composition, preferably from about 55% to about 70% and most preferably about 60%.

Since the organic solvents described above are typically not particularly good solvents or emulsifying agents for the aqueous media often required for labelled samples, the LSC cocktail of the present invention also contains a solubilizing agent which comprises a surfactant. Preferred surfactants are anionic, and nonionic. Nonionic surfactants are particularly useful in the case of acrylic solvents.

Preferred surfactants are Monawet-MM80, Aerosol-OT100 and Triton X-100. Monawet-MM80 is manufactured by Mona Industries, Paterson, N.J. 07524 and is sodium dihexyl sulfosuccinate. Monawet-MM80 is effective both as a dry powder or as an 80% solution in water-isopropanol. Aerosol OT-100 is manufactured by American Cyanamid Co., Wayne, New Jersey 07470 and is sodium di(2-ethylhexyl)sulfosuccinate. Triton X-100 is manufactured by Rohm and Haas, Philadelphia, Pa. 19105, and is a mixture of ethoxylated t-octyl phenols.

It is also preferred that the organic solvents and the solubilizing agent be used in certain combinations: e.g. styrene and related vinyl and allyl aromatics with the sodium dialkyl sulfosuccinates; and methylmethacrylate and related acrylic esters with ethoxylated alkyl phenols. The solubilizing agent is employed in a concentration sufficient to emulsify the desired sample for counting purposes. Such concentrations are typically in the range from about 7% by volume to about 30% by volume of the total composition, preferably from about 10% to about 25% and most preferably about 20%.

An intermediate solvent is added to the LSC cocktail composition to more efficiently transfer the energy produced by the radiolabelled sample to the organic solvent which contains the dissolved organic scintillator described below. The intermediate solvent can be any of those described in the prior art, preferred intermediate solvents being naphthalene, 1-methylnaphthalene, 2-methylnaphthalene, acenaphthalene and mixtures of the isomeric methylnaphthalenes. The concentration of the intermediate solvent is typically from about 5 to 30% by weight of the total composition, preferably from about 10% to about 25%.

The organic scintillators useful in the present invention are any of those well known in the art, used alone or in combination. When combinations of primary scintillator solutes are used, they are preferably combined in ratios ranging between 1:3 and 3:1. These primary solutes may be used along or in conjunction with secondary scintillator solutes.

Typical ratios of primary solute to secondary solute are from 4:1 to 49:1; preferably 49:1. Preferred primary and secondary solutes are as follows:

| Primary Scintillator Solutes | Secondary Scintillator Solutes |
| --- | --- |
| 2,5-diphenyloxazole | p-bis(o-methylstyryl)benzene |
| p-terphenyl | 2-(4'-biphenylyl)-6-phenylbenzoxazole |
| 2-(4-t-butylphenyl)-5-(4-biphenylyl)-1,3,4-oxadiazole | 1,4-bis-2-(5-phenyl-oxazolyl)benzene |
| 2,5-bis[5'-t-butyl(benzoxazolyl (2')]thiophene | |

The total concentration of organic scintillator is typically from about 0.2% to about 20% by weight of the total composition, preferably from about 2% to about 10%, and most preferably about 5%.

It should be noted that the present invention is useful in conjunction with any of the samples and labels used with LSC cocktail in the past since it is not affected by the particular label used.

U.S. Pat. No. 3,068,178 incorporated herein by reference describes scintillation solutions employing styrene as an organic solvent, naphthalene as an intermediate solvent, and 2,5-diphenyloxazole as the organic scintillator. No mention is made therein of any type of solubilizing agent. While the use of such agents are known for use in formulating LSC cocktails, there is no suggestion of the surprising results obtained by the composition of the present invention. Furthermore, while that patent describes solid plastic scintillators of polystyrene, liquid scintillators and plastic scintillators are considered separately and there is no suggestion of the composition of the present invention where the composition is used in liquid form for counting and then subsequently polymerized by the addition of suitable polymerizing agents. The patent also describes the difficulties encountered when trying to measure the activity of water soluble compounds, i.e. physiological compounds such as steroids which are not in the conventional solvents used in scintillators. By the present invention, a liquid composition is provided which readily counts aqueous samples and is also readily polymerized to form a solid as described below.

The invention will be further clarified by a consideration of the following examples, which are intended to be purely exemplary of the use of the invention.

EXAMPLE I

To a solution of 75 ml styrene, purified by passage through alumina, and 25 ml anionic surfactant, Monawet-MM80 (Mona Industries) was added 10 g of a composition containing 98% by weight 2,5-diphenyl oxazole and 2% by weight p-bis(o-methylstyrylbenzene), and 25 g naphthalene.

EXAMPLE II

To a solution of 75 ml methylmethacrylate and 25 ml Monawet-MM80 was added 20 g naphthalene and 10 g of a composition containing 98% by weight 2,5-diphenyloxazole and 2% by weight p-bis(o-methylstyrylbenzene).

EXAMPLE III

To a solution of 40 ml allylbenzene, purified by passage through alumina and 10 g Aerosol OT-100 (American Cyanamide) was added 250 mg of 2,5-bis[5'-t-butylbenzoxazolyl](2')thiophene and 10 ml 1-methylnaphthalene.

Determination of Counting Efficiencies

Counting efficiencies were determined by addition of 100λ, 200λ, 300λ and 500λ aliquots of tritiated water to 5 ml samples of liquid scintillator. The efficiencies obtained from the resultant emulsion system were compared to those obtained with a commercial emulsion system, Aquasol ® sold by New England Nuclear Corp., Boston, Mass. Percent efficiencies are compiled in Table 1. The liquid scintillators prepared in accordance with Examples I, II and III are referred to as liquid scintillators I, II and III, respectively.

TABLE 1

| Percentage Efficiencies of Liquid Scintillators | | | | |
|---|---|---|---|---|
| Aliquot $^3H_2O$ | 100λ | 200λ | 300λ | 500λ |
| % efficiency in Aquasol ® | 29.1 | 26.2 | 25.8 | 24.0 |
| % efficiency scintillator I | 22.4 | 22.9 | 22.8 | 23.6 |
| % efficiency scintillator II | 13.9 | 14.3 | 13.1 | 14.6 |
| % efficiency scintillator III | 28.3 | 26.7 | 25.7 | 24.9 |

After use of the LSC cocktail for counting, the LSC cocktail is solidified by adding any of a variety of compounds designed to aid in the polymerization of the used LSC cocktail including free radical initiators, promoters, crosslinking agents, thickeners, stabilizing monomers and comonomers. For purposes of the present invention, it is important to distingush the present invention where the solvent of the scintillator is actually polymerized from the prior art composition described above where monomers are added and then the added monomers are polymerized thereby encapsulating the used LSC cocktail. Whereas the prior art resulted in a solid having the disadvantages set forth above including the generation of additional waste as a part of the polymerization process, in one embodiment, the present invention provides a LSC cocktail which does not substantially increase in volume during the solidification procedure. Accordingly, a process for disposing of LSC cocktail waste is provided which converts the waste to a form which is safer to handle than the prior art and the LSC cocktail is solidifiable without any substantial increase in bulk. If desired, polymerization can be conducted in the same vial used for counting. In addition, the present invention produces a radwaste wherein the liquid organic solvent itself is converted into a solid, whereas in the prior art the liquid organic solvent remains a liquid even after encapsulation or absorption increasing the chances of release to the environment.

Where polymerization is accomplished by using polymerizing agents other than comonomers, it is usually necessary to heat the solutions as described below. However, by using comonomers, polymerization can be accomplished at room temperature. For instance, as shown in Table III, the LSC cocktail of Example I was solidified at room temperature by using maleic anhydride as a comonomer. Although the volume of the resulting disposable radwaste is substantially increased by using this embodiment, it has the advantage of being readily used with large volumes of liquid radwaste, i.e. 55 gallon drums are often used for disposal, without requiring that the liquid be heated. Those skilled in the art can readily determine which of the above embodiments is preferable given a particular situation. Preferred comonomers are shown in Table II, however other comonomers having vinyl groups associated with strongly electron withdrawing substituents, e.g. nitriles, are potentially useful in the practice of the present invention.

Free radical initiators, promoters, stabilizing monomers thickeners, crosslinking agents, and comonomers useful in the practice of the present invention are well known in the prior art. Examples of such compounds are set forth in Table II.

TABLE II

| Initiators |
|---|
| azobisisobutyronitrile |
| benzoyl peroxide |
| cumene hydroperoxide |
| ferrous sulfate/hydrogen peroxide |
| potassium persulfate |
| lauroyl peroxide |
| Promoters |
| cobalt naphthenate |
| dodecyl mercaptan |
| N,N—dimethylaniline |
| Stabilizing Monomers |
| hydroxyethylmethacrylic acid |
| methacrylic acid |
| vinyl acetate |
| Thickeners |
| polyacrylic acid |
| Crosslinking Agents |
| divinylbenzene |
| Co-monomers |
| maleic anhydride |
| acrylonitrile |

Such polymerizing agents are added in sufficient amounts to result in the polymerization of the LSC cocktail of the present invention. The amounts of these agents necessary to polymerize solutions of the organic solvents used in the present invention are readily determined by those skilled in the art and except for the comonomers are typically employed in concentrations up to about 10% by weight. The amount of polymerizing agent to be added is largely controlled by the degree of solidification desired. In a case where the waste is to be transported before disposal, it is preferred that the solid not flow if the container used for transportation is ruptured in some manner. Furthermore, if ultimate disposal is to be in a landfill, the solidification should be such that leaching would be minimal if the container used to hold the waste were ruptured. Excesses of polymerizing agents are not detrimental to practice of the present invention, the amount to be used being primarily limited by economic considerations.

Satisfactory solids were obtained for the LSC cocktail of Example I and III by using the combinations of reagents and conditions set forth in Table III.

It is preferred that the waste LSC cocktail be heated after the polymerizing agents have been added to speed the polymerization process. Preferred temperatures are between about 60° and about 100° C. for between about 1 and about 16 hours. The time and temperature can vary over a wide range, the only criteria being the production of a disposable solid which is readily determined as described above.

The present invention also comprises a kit which include at least one container of the LSC cocktail of the present invention and at least one vial containing an appropriate combination of polymerizing agent.

TABLE III

| | | | Conditions for the Solidification of Liquid Scintillators | | | | | |
|---|---|---|---|---|---|---|---|---|
| LSC Cocktail | Initiator | Promoter | Stabilizing Monomer | Thickener | Crosslinking Agents | Co-monomer | T(°C.) | Time Hours |
| Example I (5 ml) | lauroyl peroxide 100 mg | Cobalt naphthenate | — | — | divinylbenzene 1 ml | — | 80° | <1 |
| Example I (5 ml) | benzoyl peroxide 100 mg | — | hydroxyethyl-methacrylic acid 1 ml | polyacrylic acid 250 mg | divinylbenzene 50λ | — | 80° | <16 |
| Example I (5 ml) | azobisisobutyro-nitrile 75 mg | — | methacrylic acid 1 ml | polyacrylic acid 250 mg | divinylbenzene 50λ | — | 80° | 1 |
| Example I (5 ml) | lauroyl peroxide 75 mg | — | — | — | — | maleic anhydride 3.9 g | 20-25° | 4 |
| Example III (5 ml) | azobisisobutyronitrile 100 mg | — | — | — | — | 3.8 g | 80° | 16 |

To polymerize the LSC cocktail after use, the contents of a vial of polymerizing agent would be added to the used LSC cocktail. Depending on the combination of cocktail formulation and polymerizing agent, heating may be necessary to complete the polymerization to a solid. Preferably the container used in a kit to hold the LSC cocktail would also be of a suitable material, e.g. polyethylene vial, such that it could also serve as the disposal container. In such an embodiment, the used LSC cocktail would simply be returned to its original container, the vial of polymerizing agent added and the container heated as necessary or desired until solidification occurs at which time the solidified LSC cocktail would be disposed of in accordance with the normal procedures used for disposal of such radioactive wastes.

While the above discusses small scale waste disposal such as might be used in a small research facility, it should be understood the polymerization can also be performed in bulk by combining a number of samples before polymerizing. For example, where waste liquid samples are sent to a central processing facility in glass vials, a vial crusher could be used to consolidate the samples prior to treatment. Polymerization would then be performed as above.

Another alternative is that the solidified LSC cocktail could be incinerated since the components of the LSC cocktail are readily subject to combustion. Accordingly, the method and kit of the present invention are useful no matter which ultimate disposal technique is to be used.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A method of disposing of used liquid organic scintillation cocktail containing a polymerizable organic scintillation solvent comprising polymerizing the scintillation solvent of said cocktail.

2. A method as claimed in claim 1 wherein said polymerization is accomplished by the addition of a polymerizing agent to said cocktail.

3. A method as claimed in claim 2 wherein said polymerizing agent is a promoter, an initiator, a stabilizing monomer, a thickener, or a crosslinking agent.

4. A method as claimed in claim 3 wherein said promoter is cobalt naphthenate.

5. A method as claimed in claim 3 wherein said initiator is lauroyl peroxide, benzoyl peroxide or azobisisobutyronitrile.

6. A method as claimed in claim 3 wherein said stabilizing monomer is hydroxyethylmethacrylic acid or methacrylic acid.

7. A method as claimed in claim 3 wherein said thickener is polyacrylic acid.

8. A method as claimed in claim 3 wherein said crosslinking agent is divinylbenzene.

9. A method as claimed in claim 2 wherein less than about 10% by weight of polymerizing agent is added to said cocktail.

10. A method as claimed in claim 2 wherein heat is applied to the solution of said cocktail and polymerizing agent.

11. A method as claimed in claim 2 wherein said polymerizing agent is a comonomer which copolymerizes with the polymerizable organic scintillation solvent.

12. A method as claimed in claim 11 wherein said comonomer is maleic anhydride.

13. A kit for use in liquid scintillation comprising at least one vial containing a liquid organic scintillation cocktail which is readily polymerized for disposal as a solid comprising from about 45% to about 80% by volume of a polymerizable organic solvent for an organic scintillator, a solubilizing agent in sufficient amounts to disperse an aqueous sample in said cocktail, from about 5% to about 30% by weight of an intermediate solvent and from about 0.2% to about 20% by weight of an organic scintillator and at least one vial containing polymerizing agent.

14. The kit of claim 13 wherein said vials are made of a material which can be readily incinerated.

15. The kit of claim 14 wherein said vials are polyethylene.

16. A polymerized composition comprising the reaction product resulting from polymerization of used liquid organic scintillation cocktail and a polymerizing agent.

17. A composition as claimed in claim 16 wherein the volume of polymerizing agent does not substantially contribute to the volume of said polymerized composition.

18. A composition as claimed in claim 17 wherein the concentration of said polymerizing agent is less than about 10% by weight.

19. A composition as claimed in claim 16 wherein substantially all of said liquid cocktail is polymerized.

20. A composition as claimed in claim 16 wherein said polymerized composition is sufficiently rigid to maintain its shape at ambient temperatures in the absence of externally applied pressure.

21. A method of disposal of used liquid organic scintillation cocktail containing a polymerizable organic scintillation solvent comprising polymerization of the scintillation solvent of the liquid organic scintillation cocktail followed by incineration.

* * * * *